(12) United States Patent
Yu (10) Patent No.: US 12,224,636 B1
(45) Date of Patent: Feb. 11, 2025

(54) STATOR OF DISC-TYPE MOTOR AND WINDING METHOD THEREOF

(71) Applicant: Renwei Yu, Wuhan (CN)

(72) Inventor: Renwei Yu, Wuhan (CN)

( * ) Notice: Subject to any disclaimer, the term of this patent is extended or adjusted under 35 U.S.C. 154(b) by 0 days.

(21) Appl. No.: 18/059,272

(22) Filed: Nov. 28, 2022

Related U.S. Application Data (63) Continuation of application No. PCT/CN2020/141995, filed on Dec. 31, 2020.

(51) Int. Cl.
*H02K 3/26* (2006.01)
*H02K 3/28* (2006.01)
*H02K 15/04* (2006.01)

(52) U.S. Cl.
CPC ............. *H02K 3/26* (2013.01); *H02K 3/28* (2013.01); *H02K 15/0407* (2013.01); *H02K 2203/03* (2013.01)

(58) Field of Classification Search
CPC ........ H02K 3/26; H02K 3/28; H02K 15/0407; H02K 2203/03
USPC ......................................................... 310/208
See application file for complete search history.

(56) References Cited

U.S. PATENT DOCUMENTS

| | | | |
|---|---|---|---|
| 4,363,988 A | 12/1982 | Kliman | |
| 4,398,112 A * | 8/1983 | van Gils | H02K 3/04 310/201 |
| 4,568,862 A * | 2/1986 | Tassinario | H02K 29/10 318/400.41 |
| 8,253,299 B1 * | 8/2012 | Rittenhouse | B62M 6/90 310/257 |
| 8,860,405 B2 * | 10/2014 | Kino | G01D 5/00 324/207.25 |
| 9,780,615 B2 * | 10/2017 | Chen | H02K 3/26 |
| 9,887,597 B2 * | 2/2018 | Horng | H02K 11/33 |
| 10,186,922 B2 * | 1/2019 | Schuler | H02K 11/30 |
| 10,263,485 B2 * | 4/2019 | Koenen | F01P 1/02 |
| 10,340,760 B2 * | 7/2019 | Schuler | H02K 3/521 |
| 10,505,422 B2 * | 12/2019 | Libault | B60L 15/2054 |
| 2013/0271122 A1 * | 10/2013 | Kino | G01B 7/30 324/207.25 |
| 2014/0070638 A1 * | 3/2014 | Brennvall | H02K 3/28 310/208 |
| 2016/0315510 A1 * | 10/2016 | Kawamata | H02K 1/2795 |

FOREIGN PATENT DOCUMENTS

| | | |
|---|---|---|
| CN | 105896760 A | 8/2016 |
| CN | 106341017 A | 1/2017 |
| CN | 108809022 A | 11/2018 |

(Continued)

OTHER PUBLICATIONS

Internation Search Report of PCT/CN2020/141995, Mailed Jun. 24, 2021.

*Primary Examiner* — Alex W Mok (57) ABSTRACT

The present invention provides a stator of a disc-type motor and a winding method thereof. A circle of coil units (20) filled into coil slots (1) are arranged on a disc-shaped stator disc (12); jumper wire slots (10), fly wire slots (3) and jumper wire joint holes (7) are formed in the radial outer sides of the coil slots (1); and the coils are wound, overlapped and filled into the coil slots in a disc shape and are connected with one another in series by connecting wires embedded into the stator disc (12) in the same current direction.

8 Claims, 13 Drawing Sheets

(56) References Cited

FOREIGN PATENT DOCUMENTS

| CN | 110048567 A | 7/2019 |
| CN | 111786489 A | 10/2020 |
| CN | 211830523 U | 10/2020 |

* cited by examiner

STATOR OF DISC-TYPE MOTOR AND WINDING METHOD THEREOF

CROSS-REFERENCE TO RELATED APPLICATIONS

This application is a continuation of International Patent Application No. PCT/CN2020/141995 with a filing date of Dec. 31, 2020, designating the United States, now pending. The content of the aforementioned applications, including any intervening amendments thereto, are incorporated herein by reference.

TECHNICAL FIELD

The present invention relates to a disc-type motor, and particularly relates to a stator of a disc-type motor.

BACKGROUND OF THE PRESENT INVENTION

The traditional disc-type motor has low power density, and the inventor has found the technical solution of a disc-type motor, which can break through the bottleneck of the traditional disc-type motor, through experiments. The technical solution is applied to a disc-type generator and aims at a stator of the disc-type generator; and the stator of the disc-type generator in the prior art is provided with an iron core and is large in volume, heavy in weight and low in copper proportion, so that the output efficiency is low, the power quality is poor, and the flexibility is poor. Therefore, the disc-type motor is difficult to be widely applied for a long time.

SUMMARY OF PRESENT INVENTION

The technical problem to be solved by the present invention is to provide a stator of a disc-type motor, which ensures the stability of stator coils while minimizing the distance between a rotor and each part of the stator coils, is beneficial to efficient production and simplification of the production process, reduces the pulsating torque and improves the running smoothness of the motor.

The stator of the disc-type motor is characterized by comprising a disc-shaped stator disc and coil units fixed in coil slots of the stator disc.

The stator disc is in a flat plate shape and is made of a non-magnetic insulating material, and a circle of coil slots surrounding the center of a circle are formed in the stator disc; connecting wire joint holes and connecting wires comprising jumper wires are arranged on the stator disc at the radial outer sides of the coil slots; the connecting wires are connected with coils in the coil slots through connecting wire slots; the outer sides of the connecting wire slots are formed in the surface of the stator disc or buried in the stator disc; the jumper wire refers to a connecting wire of the coils in the adjacent coil slots and is arranged in a jumper wire slot in the stator disc, and the two ends of each jumper wire slot are communicated with the adjacent coil slots; and each connecting wire joint hole is communicated with the corresponding coil slot through the corresponding connecting wire slot.

The stator disc is provided with one phase of main winding or multiple phases of main windings; the main winding is formed by connecting the respective phases of coil units in series; the same phase of single coils in one coil slot of the main winding form a coil unit; one single coil is formed by winding a coil wire along the same direction without branches or ion cores; one single coil is formed by axially overlapping two layers of single-layer coils into one coil slot; the axial thickness of one single-layer coil is the thickness of the single coil wire; and the width direction of the coil wire is the axial direction of the stator disc.

Wherein the single-layer coil is a spiral coil in a same plane; two wire ends of one single coil respectively belong to an upper-layer single-layer coil and a lower-layer single-layer coil; and the two wire ends are located at the outer side of the spiral coil.

In an embodiment of a phase number of windings, when the stator disc is provided with multiple phases of windings, each phase of winding is formed by connecting a plurality of single coils through jumper wires and/or fly wires in series; the fly wire refers to a connecting wire of an interval of more than one coil slot; each fly wire is at least partially embedded into a fly wire slot; and one end of each fly wire slot is communicated with the coil slot.

In an embodiment of another phase number of windings, one stator disc is only provided with a single phase of winding.

As an embodiment, each coil unit is formed by axially overlapping an even number of single coils; connecting wire joint holes comprise serial wire joint holes; different single coils in the same coil unit are connected with one another by a serial wire; and each serial wire is welded in the serial wire joint hole through the wire slot.

As a different embodiment, a plurality of coil units are filled in each coil slot of the main winding; each coil unit is formed by the single coils; and the coil units are not connected with each other.

As an embodiment, a circle of coil slots surrounding the center of the circle are also internally provided with auxiliary wire slots; and an auxiliary winding independent of the main winding is filled into each auxiliary wire slot.

Preferably, the cross section of each coil wire is a rectangle or a rounded rectangle.

A winding method of the stator of the disc-type motor is characterized by comprising the following steps:

I. after an even number of layers of prefabricated single coils are overlapped and filled into coil slots, coating fixing glue between the single coils and the coil slots and solidifying the fixing glue;

II. for each single coil, setting a wire end of an upper-layer single-layer coil as a wire inlet end and a wire end of a lower-layer single-layer coil as a wire outlet end, and if a serial wire needs to be connected in the coil slot, embedding the wire end of the single coil, which is connected with the serial wire, into a groove in which a serial wire joint hole is located; and embedding the wire end of the single coil, which is connected with a jumper wire, into a corresponding jumper wire slot in which a jumper wire joint hole is located, and if a fly wire needs to be connected, embedding a wire end connected with the fly wire and a phase wire into a corresponding fly wire slot;

from connecting in to connecting out of the phase wire, keeping the direction of current of the phase of winding which sequentially flows through the respective single-layer coils single, and then selecting wire ends to be connected of the serial wires, the jumper wires and the fly wires; and III. welding the serial wires and/or the jumper wires connected, connecting the wire ends of the fly wires and corresponding fly wire connecting ends when in necessary, and eliminating connecting wire joints protruding out of the surface of the stator disc after being welded.

As an embodiment, the winding manner of the single coil is simultaneously winding a set circle number in opposite spiral directions in the middle of a coil wire, and then coaxially stacking coils in a double-layer manner, to form double layers of coils which are screwed in from one wire end and then wound out from the other wire end in the same spiral direction.

In order that the stator of the disc-type motor cuts magnetic lines of force under the maximum magnetic field intensity, the magnetic field intensity is inversely proportional to the square of the distance to a magnet; the perpendicular distance between each part of the stator coils and rotor magnets needs to be as close as possible; and if multiple layers of rotors are adopted, the interval between the adjacent rotors needs to be as close as possible, and the stability and reliability of an electronic coil is ensured. In the stator of the disc-type motor of the present invention, through reasonable arrangement of the coils, the utilization ratio of a magnetic field space is maximized, an iron core is omitted, and the iron loss is avoided; meanwhile, the copper proportion is improved through the utilization of the space; under the condition that the distance of a pair of rotors with permanent magnets, which are arranged at the two sides of each stator coil, is close enough, based on the reasonable structure and process conditions, the output power density and output efficiency of the motor with the equivalent volume and mass are improved greatly; and the output efficiency is much higher than the output efficiency of a present bucket-type motor and a present disc-type motor.

Therefore, the present invention further proposes a structure of a stator with the axial thickness being compressed to the greatest extent, and a winding method.

1. Each coil is wound only in a single-layer manner, multiple layers are directly stacked, and the coil units are modularized; and the coil does not have inclined routing. Therefore, no space is occupied by the inclined routing; the thickness of one layer of coil is only a wire width, thereby utilizing the axial thickness space of the stator to the greatest extent; and the copper proportion of the coil is high, and the output efficiency is high.

2. The connecting wires between the coils are standardized, comprise three categories: the serial wires, the jumper wires and the fly wires and are clear to be used in corresponding structures; the serial wires are used in the coil slots, the jumper wires are used between the adjacent slots, and the fly wires are used in coil assemblies; and the splicing manner of the coils is flexible, and the coils can be lapped into different phase numbers and different output voltages as required and can be used for a main coil or an auxiliary coil. The positions of distribution of all the connecting wires form a rule, so that mistakes are not easily made in wire connection; and the disc surface is easily identified, is convenient for realizing automation of the production process and is beneficial to improvement of the production efficiency.

3. The thickness of the stator disc is the thickness of the coil; various connecting wires are welded in a manner that the wire slots in the stator disc extend to a radial outer ring; and routes that affect the thickness are converted to the wire slots at the radial outer sides of the coils for connection, thereby compressing the axial thickness of the stator disc to the greatest extent. In addition, the wire connection is standard, so as to realize standardized automatic welding easily. The connecting wires are arranged in the wire slots of the stator disc, so that the insulating property is good, and the stability is good; and meanwhile, the phase insulation of multiple phases of connecting wires is realized without depending on insulating layers of conducting wires.

4. The distance of the stator and a disc of each rotor is close enough; the stator coils are not provided with iron cores, still utilize the vast majority of magnetic flux and provide additional magnetic flux for multiple layers of discs; meanwhile, the eddy-current loss is reduced, the volume and the weight of the stator are reduced, and the stator coils are filled by utilizing the saved space; and an experiment shows that the output efficiency is improved. The stator disc at the radial outer sides of the coils can also be utilized for arranging a detection device and an auxiliary device.

5. An auxiliary coil slot is formed in the coil slot cutting the magnetic lines of force, and an independent auxiliary coil is arranged; the same stator disc is utilized, so that an independent power supply can be provided and is served for monitoring and measurement of the motor; and meanwhile, the waveform deviation factor of output current of the main coil can be adjusted and reduced, so that the main coil provides waveform output with higher quality.

6. According to the structure of the present invention, staggered overlapping of multiple layers of stator discs and multiple layers of rotor discs can be realized, and the output efficiency can be further improved by utilizing multiple overlapped magnetic fields of the rotor magnets.

7. The multi-phase output of the disc-type motor is realized conveniently, the load distribution is balanced, and the utilization rate and the conversion efficiency of electric energy are improved; and meanwhile, after multi-phase coils are distributed in a balancing manner, the pulsating torque is small, the caused pulsation is small, and the stability is good, so that the rotating speed and the energy conversion efficiency can be further improved.

In the drawings: 1—coil slot; 2—fan hole; 3—fly wire slot; 4—binding wire hole; 5—fastening hole; 6—back serial wire joint hole; 7—jumper wire joint hole; 8—serial wire joint hole; 9—back jumper wire joint hole; 10—jumper wire slot; 11—fastening ring; 12—stator disc; 13—phase wire inlet end; 14—fly wire; 15—phase wire outlet end; 16—upper-layer single-layer coil; 17—lower-layer single-layer coil; 18—jumper wire; 19—serial wire; 20—coil unit; 21—single coil; 22—single-layer coil; 23—wire end code; 24—phase inlet wire end code; 25—upper-layer single coil; 26—lower-layer single coil; 27—coil wire; 28—phase outlet wire end code; 31—auxiliary wire slot; 32—main wire slot; 33—connecting wire joint hole; and 34—auxiliary coil.

DETAILED DESCRIPTION OF PREFERRED EMBODIMENTS

Figure 1:
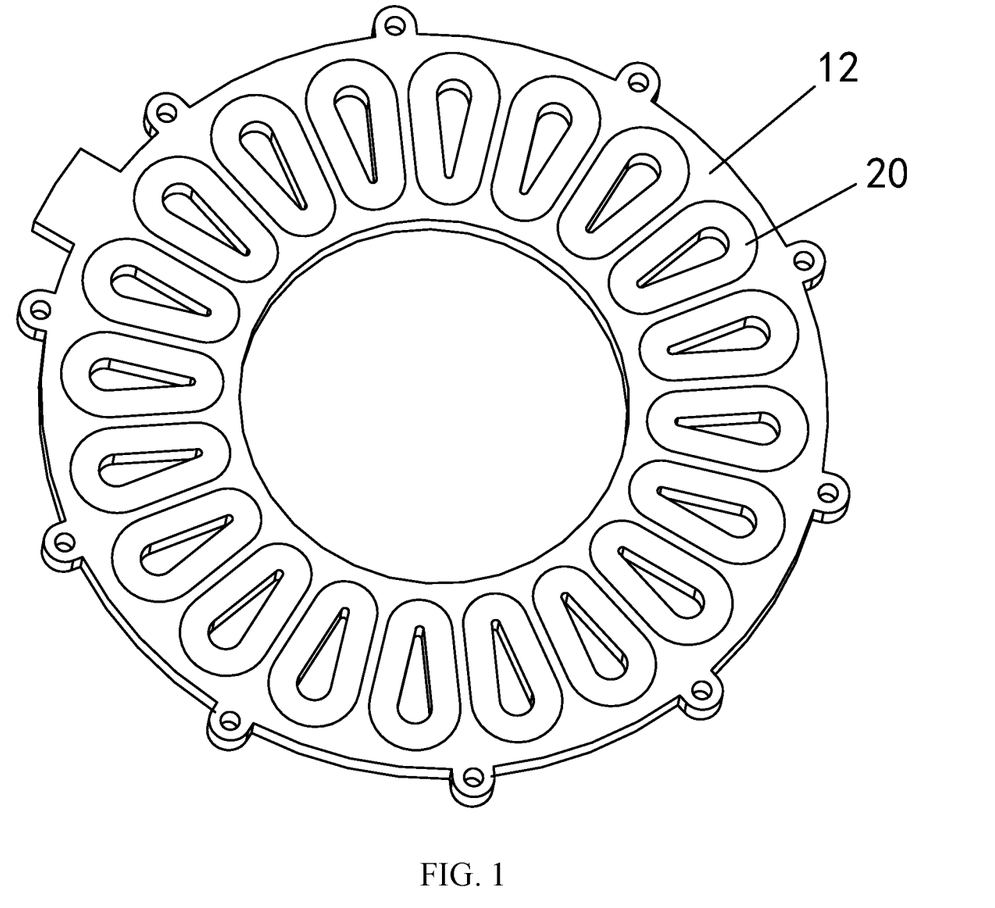
FIG. 1 is a three-dimensional structural schematic diagram of the present invention.

The present invention is further described below in combination with the drawings and embodiments: as shown in FIG. 1, a stator of a disc-type motor comprises a disc-shaped stator disc 12 and coil units 20 fixed in the stator disc; and the stator disc 12 is fixed on an outer frame by fastening screws. For the disc-type motor, rotors generating magnetic fields are arranged at one side or two sides of the stator disc; the shorter the distance from the stator to the rotors is, the higher the obtained magnetic field intensity is; and the magnetic field intensity is inversely proportional to the square of the interval. Therefore, particularly, for a motor that needs to obtain high output efficiency or needs to have small weight and small volume, the interval of the rotors at the two sides needs to be as small as possible.

The stator disc 12 is in a flat plat shape and is made of a non-magnetic insulating material; the thickness of the stator disc 12 is related to the thickness of the coil units; and the thickness is enough for forming channels in the radial outer sides of coil slots 1 or burying the channels. Theoretically, the greater radial space of the stator disc cannot hinder the running of the motor and the utilization of the magnetic fields.

A space is left at an inner ring of the stator disc 12 for a motor fan rotating with the rotors; a circle of ring-shaped coil slots 1 surrounding the center of a circle are formed in the radial outer sides; and the coil slots 1 are used for fixing and embedding coils. FIGS. 2, 3 and 8-13 are two side structures of stator discs in four embodiments.

According to different requirements, a main winding on the stator disc 12 can be provided with one phase of winding or multiple phases of windings; and the multiple phases of windings can provide multi-phase loads, which is beneficial to the balance of current distribution and the reduction of the pulsating torque. An auxiliary wire slot 31 can also be arranged between main wire slots 32 of the main winding, which provides output voltage or output power different from the main winding, so as to meet the requirements of detection or control of the motor.

Figure 9:
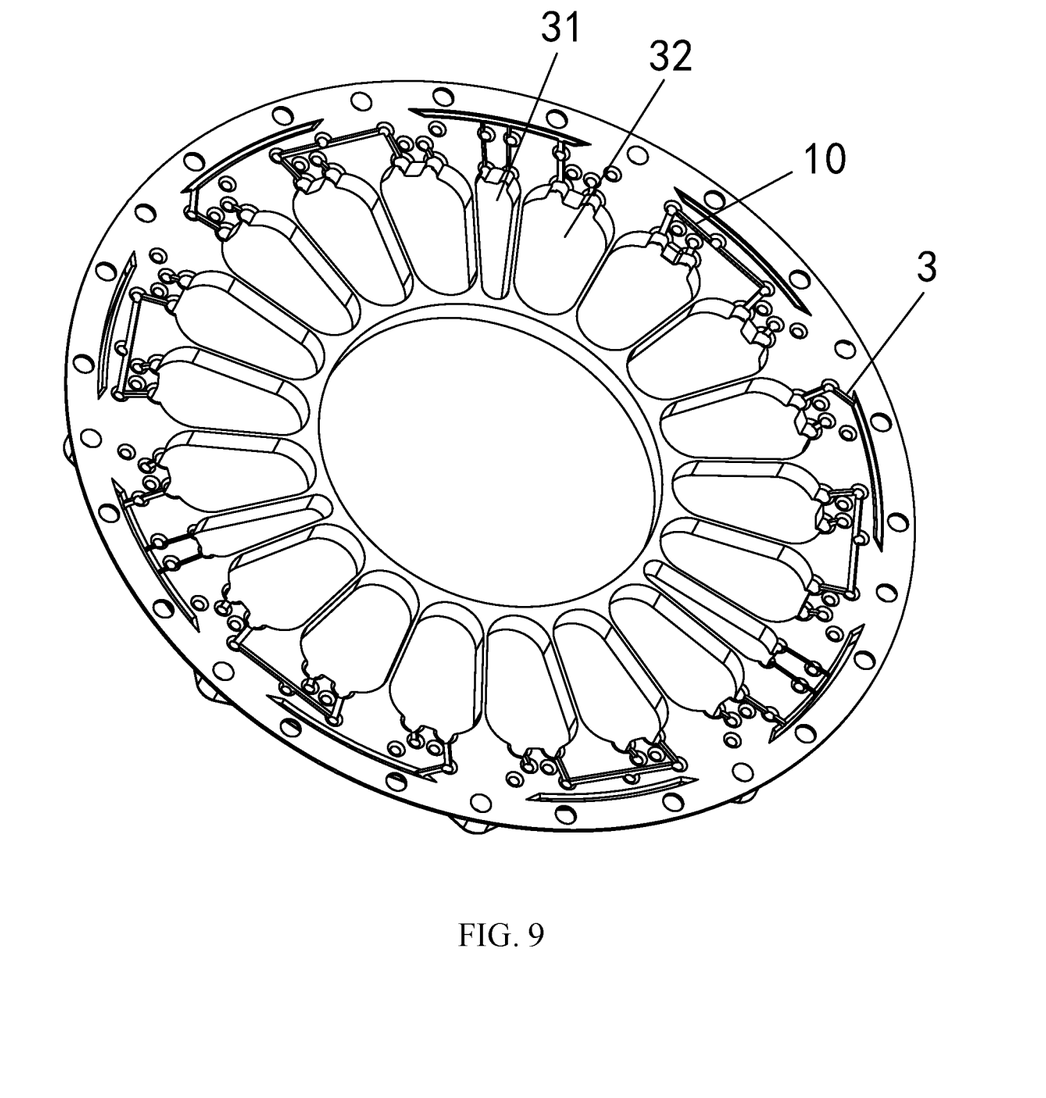
FIG. 9 is a front structural schematic diagram of an embodiment 2 of the stator disc.
Figure 10:
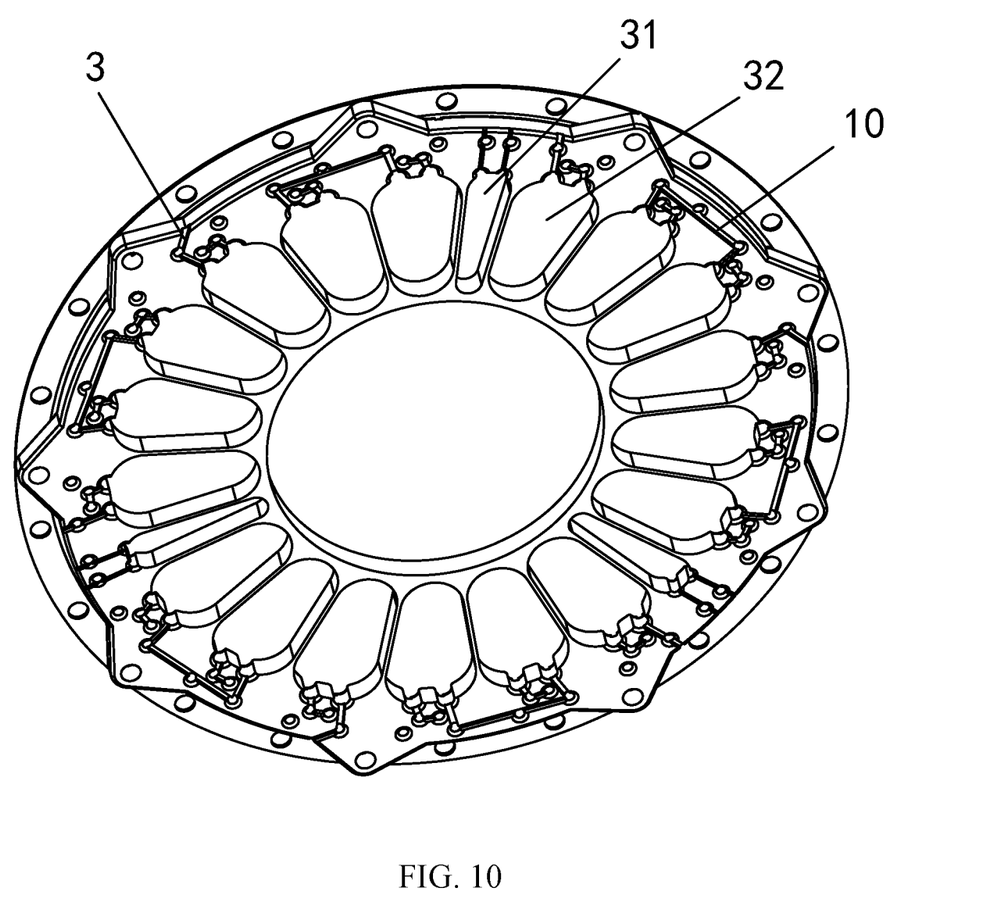
FIG. 10 is a back structural schematic diagram of the embodiment 2 of the stator disc.

For the main winding, a one-phase coil unit 20 is fixedly filled in each coil slot 1, and one coil unit 20 is formed by axially overlapping an even number of single coils 21; on one stator disc, the coil unit is a basic electric energy generation unit, and the output voltage of one winding is integer multiples of the voltage generated by coil units connected with one another in series. Auxiliary coil units different from the coil units of the main winding can also be arranged as required; FIGS. 9 and 10 are a stator disc with the auxiliary wire slots 31; and each auxiliary wire slot 31 is internally provided the auxiliary coil unit.

One coil slot 1 can also be internally provided with a plurality of coil units 20, and the plurality of coil units 20 in one coil slot 1 respectively belong to different phases of windings.

Figure 2:
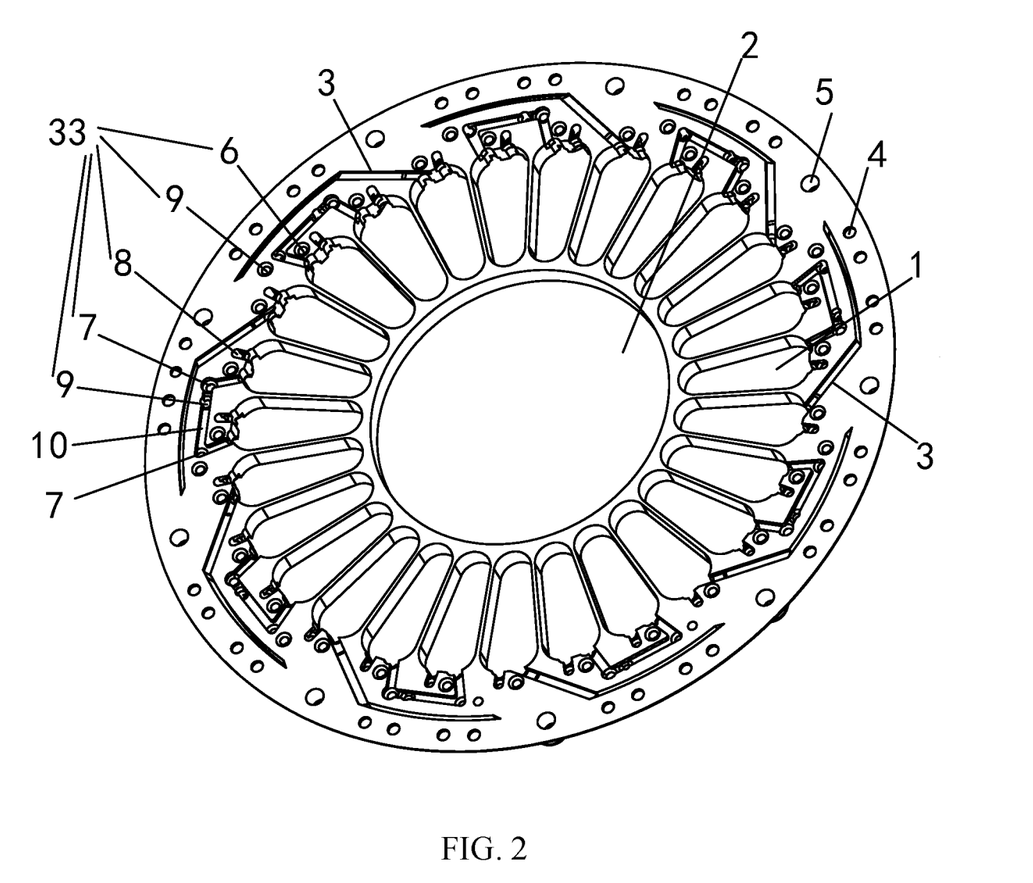
FIG. 2 is a front structural schematic diagram of an embodiment 1 of a stator disc.
Figure 3:
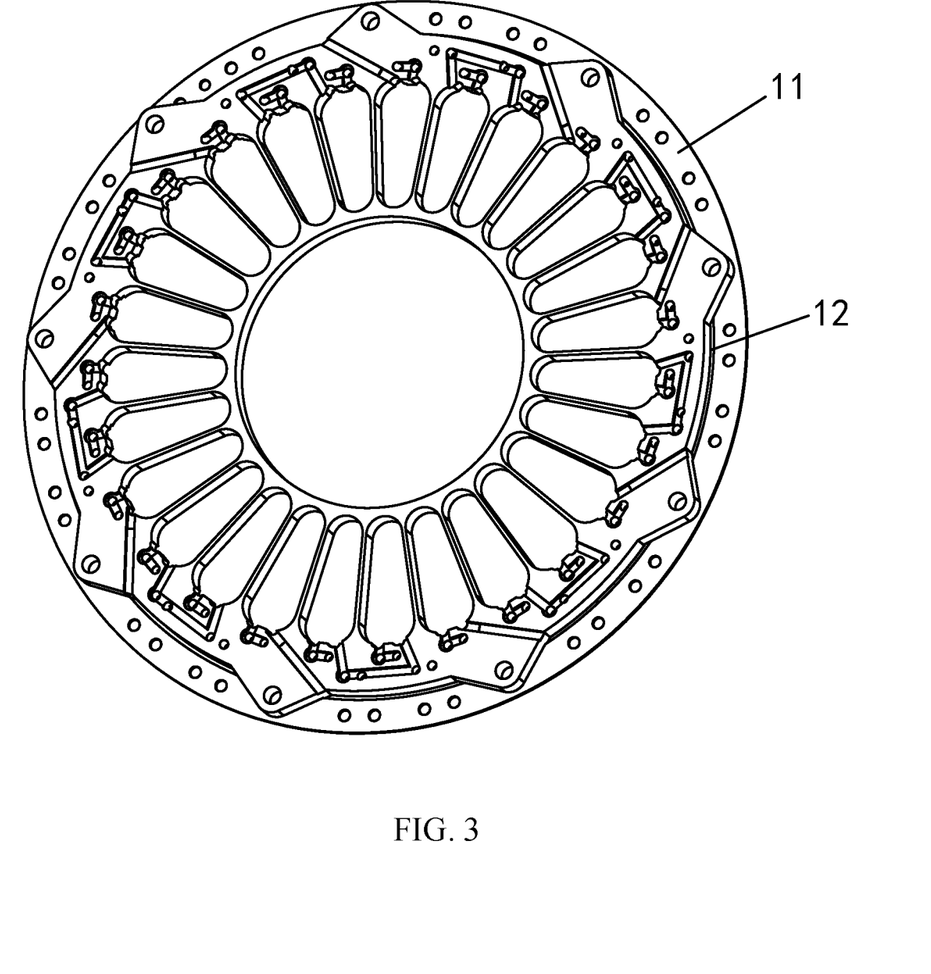
FIG. 3 is a back structural schematic diagram of the embodiment 1 of the stator disc.

Under the situation that a single coil unit 20 is arranged in one coil slot 1, as shown in an embodiment 1 in FIGS. 2 and 3, in the multiple phases of windings, jumper wire slots 10, fly wire slots 3, serial wire joint holes 8 and jumper wire joint holes 7 are formed in the stator disc 12 at the radial outer sides of the coil slots 1, and all the slots and the holes can be circumferentially and uniformly distributed at equal radius in the stator disc respectively, or can be distributed in the regions outside the radial direction of the coil slots 1; the effect of the stator disc can be realized flexibly, for example, after connecting wires connected with the coils are led out through the wire slots or pre-buried leading wires, the setting of the output current and the output voltage is realized through series-parallel connection of the coils; and installation positions of detection elements can also be set in connecting regions, and running parameters are detected by utilizing magnetic fields of the rotors.

Most of stator discs are provided with the jumper wire slots 10; the two ends of each jumper wire slot 10 are communicated with the adjacent coil slots 1, and can be formed at one side or two sides of the stator disc; the multiple phases of windings are provided with the fly wire slots 3; one end of each fly wire slot 3 is communicated with the coil slot 1; the fly wire slots 3 may be formed in one side or two sides of the stator disc as required, or penetrate through the disc surface of the stator disc; the two ends of each jumper wire slot are used for connecting the coils in the coil slots in the same side in series; a jumper wire 18 is embedded into the jumper wire slot and refers to a connecting wire of single coils in the adjacent coil slots 1; and a fly wire 14 is embedded into each fly wire slot and refers to a connecting wire of single coils in more than one coil slot 1. A serial wire 19 is a connecting wire between different single coils in the same coil slot 1; and the fly wire may be used for connecting the coils that are not adjacent in the same side in series, or may be used for connecting the coils at the different sides in series. The serial wire joint holes 8 and the jumper wire joint holes 7 are respectively communicated with the coil slots 1 through grooves. The jumper wires and the fly wires may be respectively pre-buried into the jumper wire slots 10 and the fly wire slots 3, and the connecting wire is welded at the junction of the fly wire and a coil wire. For the stator disc with auxiliary windings, the auxiliary wire slots 31 are also formed; the auxiliary wire slots and the coil slots of the main winding are commonly arranged into a ring shape, and the auxiliary wire slot is formed between the coil slots; and auxiliary coil windings are independent and are not connected with any main winding in series. FIGS. 9 and 10 are a structure of the stator disc with the auxiliary wire slots 31.

By using the wire slots of the stator disc, the coil wires can be connected stably in a manner of not protruding out of the disc surface, and the insulation between different conducting wires can be directly realized without insulating layers of the conducting wires. In addition, the connecting wires can be intuitively observed from the disc surface, so as to identify different types of stator discs. Meanwhile, the flexible connection setting can be performed for the coil units by utilizing the coil slots, a lot of single-phase output can be set as required, or can be set according to different voltage and current requirements. Because the coil units are modularized, replacement and rapid assembly are facilitated.

Figure 4:
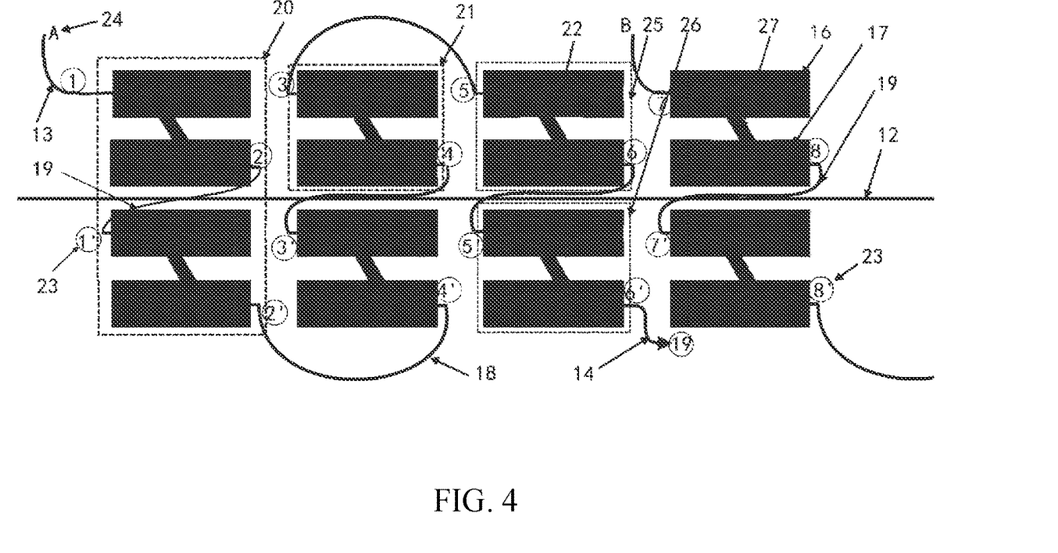
FIG. 4 is a local schematic diagram of axial cross-section winding arrangement of an embodiment of a 27-slot stator coil.
Figure 5:
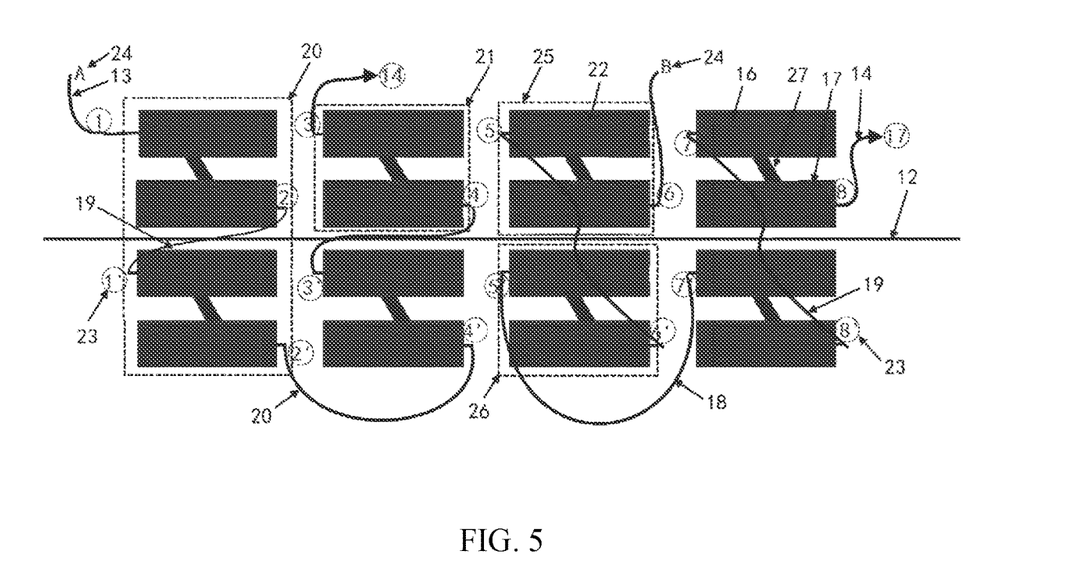
FIG. 5 is a local schematic diagram of axial cross-section winding arrangement of an embodiment of a 12-slot stator coil.

With reference to embodiments in FIGS. 4 and 5, a coil unit 20 of the main winding is one single coil 21 formed by winding one coil wire 27 along the same direction without branches or iron cores; one single coil 21 is formed by axially overlapping two layers of single-layer coils 22; the cross section of one single-layer coil 22 is a rectangle or a rounded rectangle; and relative to the axial direction of the stator disc, the thickness of one single-layer coil 22 is the thickness of the single coil wire 27, and the width direction of the coil wire 27 is the axial direction of the stator disc. The single-layer coil 22 is formed by spirally winding in a disc shape in a plane, two wire ends of one single coil 21 respectively belong to an upper-layer single-layer coil 16 and a lower-layer single-layer coil 17; and the two wire ends are located at the outer side of the spiral coil; and the upper-layer single-layer coil is wound from an inner ring to an outer ring, directly jumps to an inner ring of the lower-layer single-layer coil and is wound out in a disc shape.

One phase of winding in the multiple phases of windings is formed by connecting a plurality of single coils 21 by the serial wire 19, the jumper wire 18 and the fly wire 14 in series; each phase of winding is in centrosymmetric distribution relative to the center of the circle of the stator disc on the stator disc; or auxiliary coils or coil slots of non-main windings may also be inserted into the arrangement of the coil slots in the disc surface of the stator disc, which are not in centrosymmetric distribution.

Figure 6:
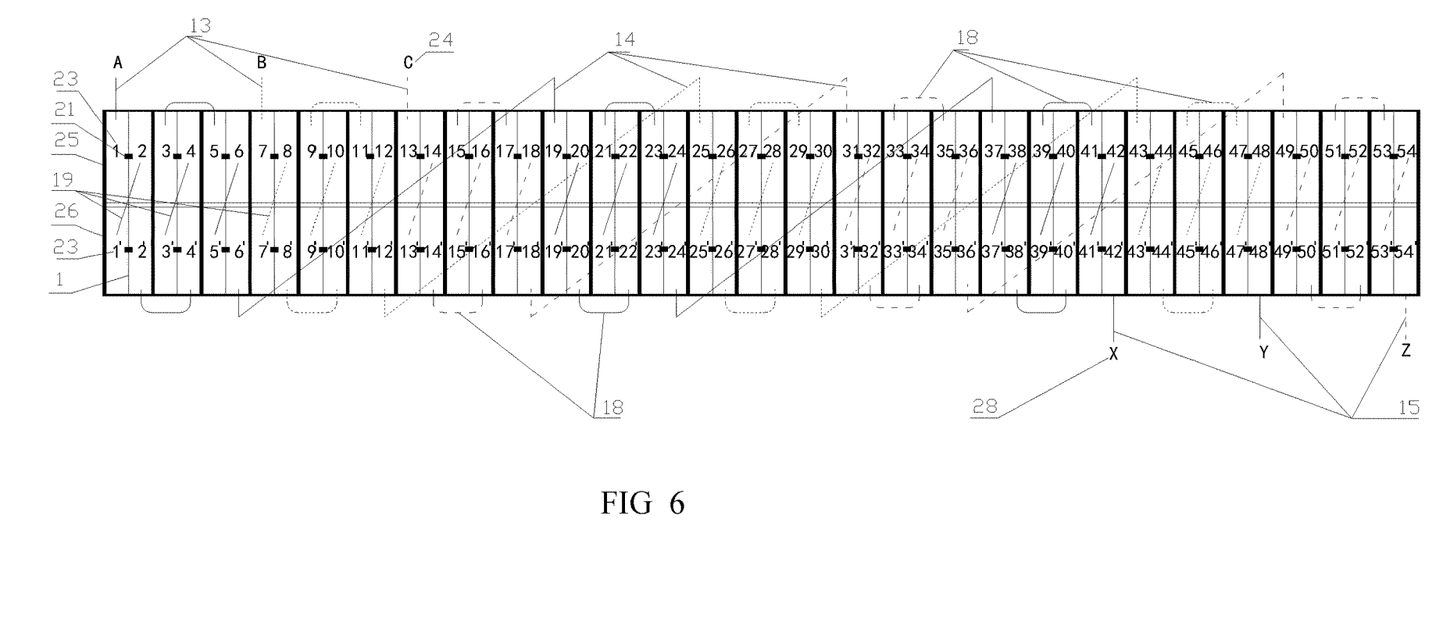
FIG. 6 is a schematic diagram of a connection method of windings in the embodiment of the 27-slot stator coil.
Figure 7:
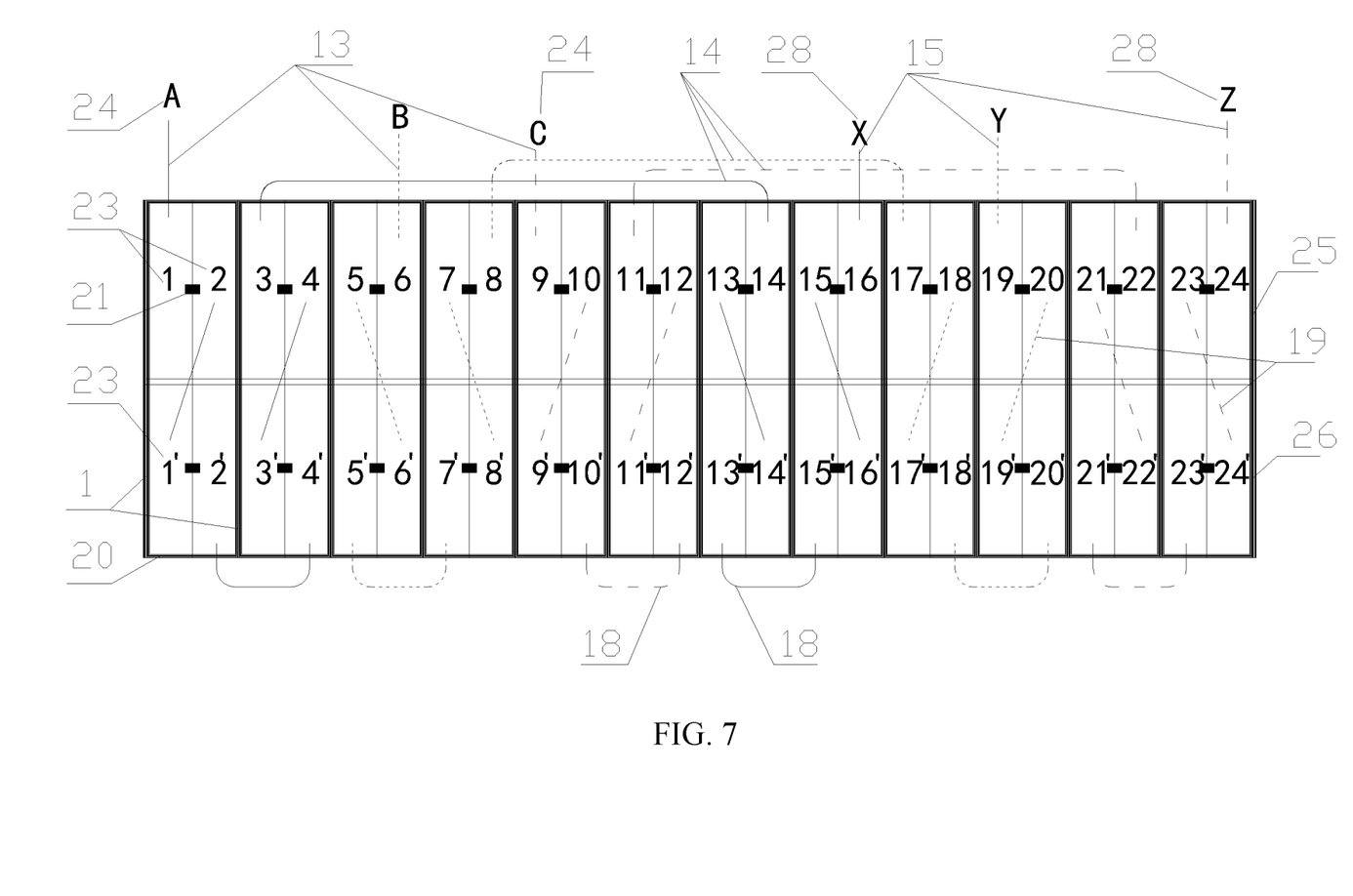
FIG. 7 is a schematic diagram of a connection method of windings in the embodiment of the 12-slot stator coil.
Figure 8:
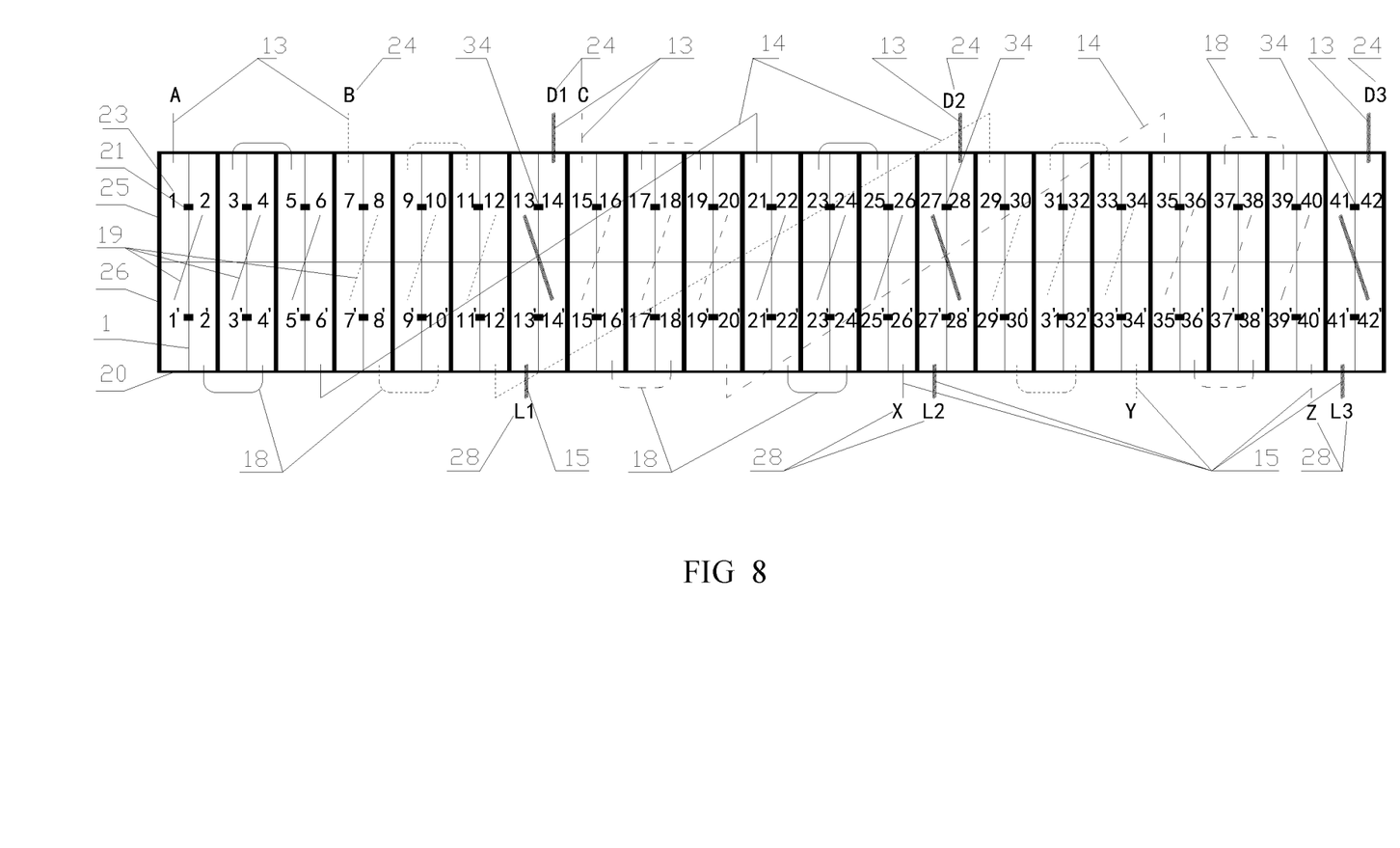
FIG. 8 is a schematic diagram of a connection method of windings in an embodiment with auxiliary coils.
Figure 11:
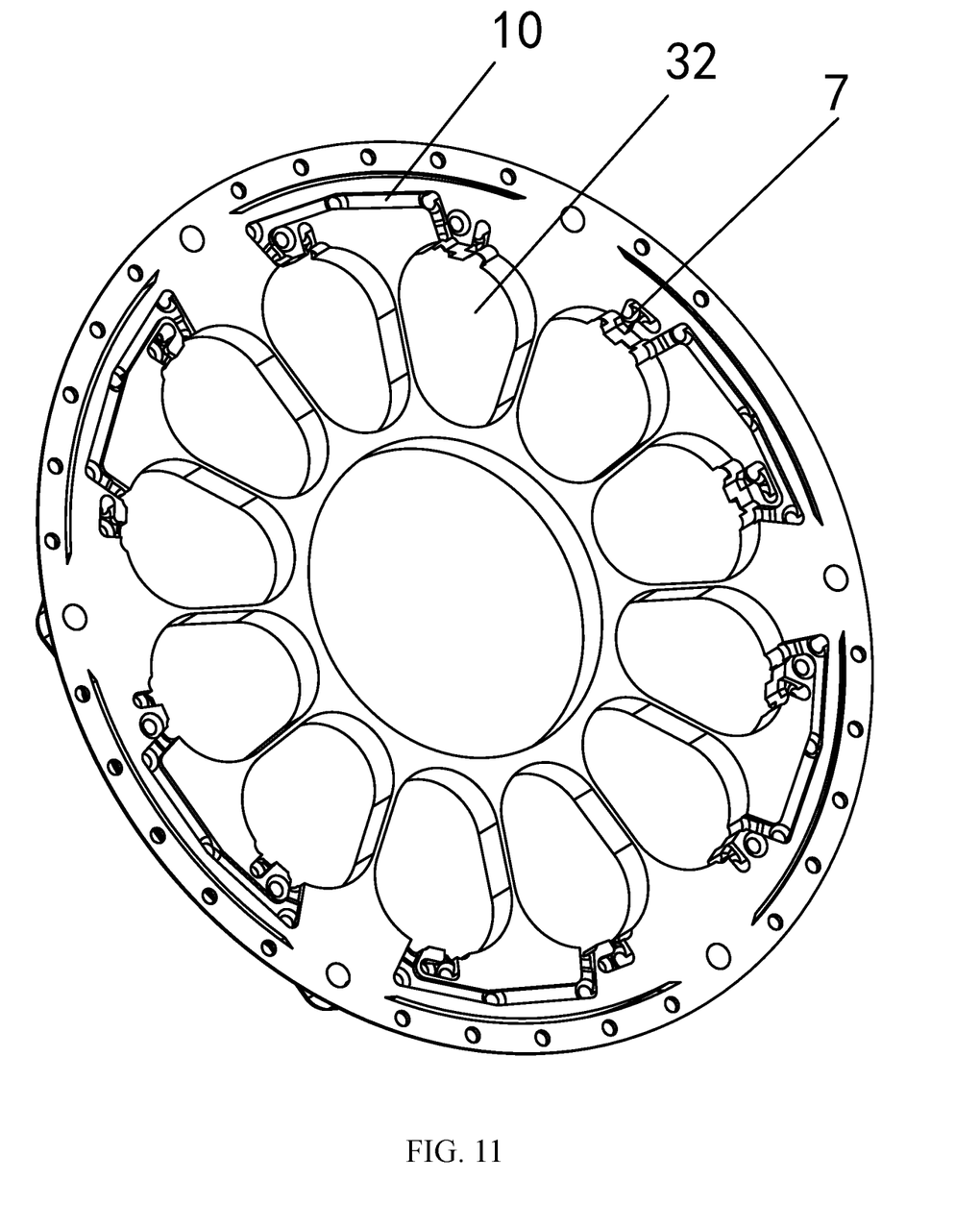
FIG. 11 is a front structural schematic diagram of an embodiment 3 of the stator disc.
Figure 12:
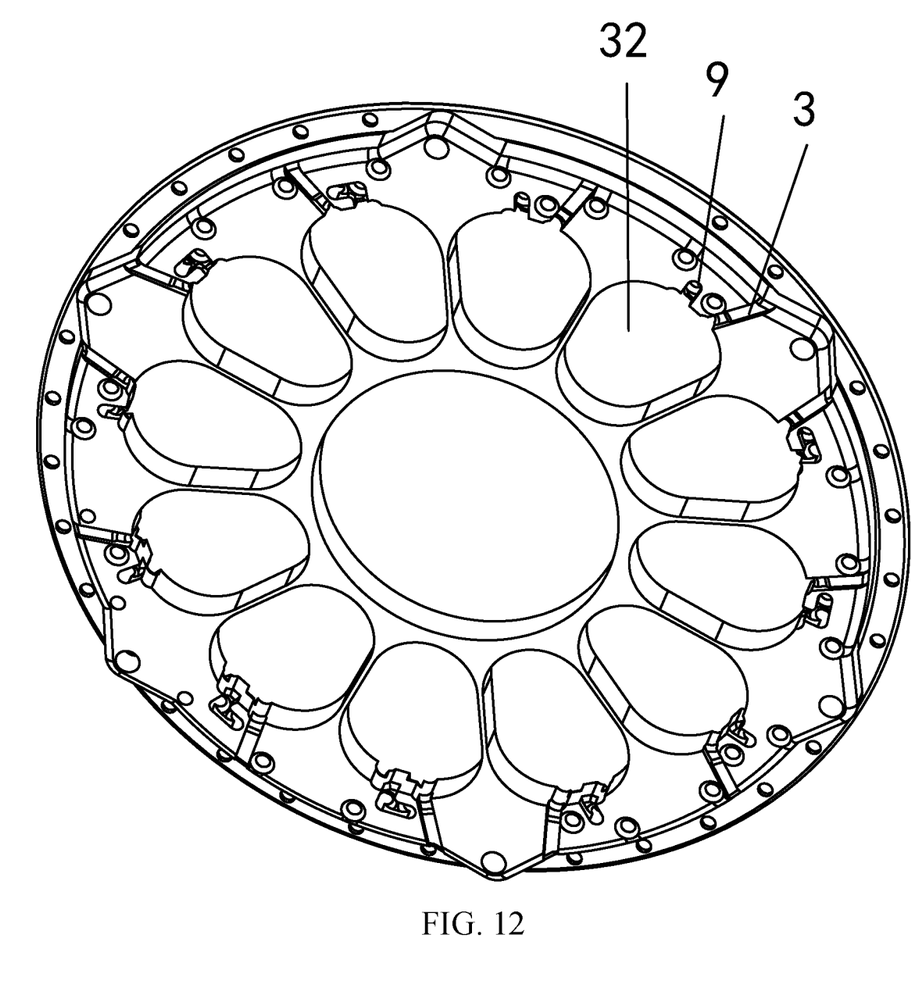
FIG. 12 is a back structural schematic diagram of the embodiment 3 of the stator disc.

As shown in FIGS. 4 and 5, without regard to the auxiliary coil windings, all the coil units are arrangement structures of the multiple phases of windings of the main windings; in addition, under the situation that only one coil unit is arranged in one coil slot, the plurality of single coils 21 in each coil slot 1 are connected in series into a coil unit 20, each phase of winding comprises M coil units 20, and M=the total number of the coil slots of the main windings/the phase number; and the M coil units are uniformly divided into N regions, each region comprises P coil units, and M, N and P are natural numbers greater than 1. By taking FIGS. 6 and 7 as examples, in FIGS. 6 and 7, a minimum thick line frame represents a coil unit; a digit in each cell represents the serial number of the wire end of the single coil; and in one coil unit, the upper row is the upper-layer single coil, and the lower row is the lower-layer single coil. In FIGS. 6 and 7, solid lines, close-interval dotted lines and sparse-interval dotted lines respectively represent conducting wires of three phases of windings. FIG. 7 shows twelve coil slots and three phases of windings; each phase of winding comprises four coil units and is divided into two groups; each group comprises two coil units; M, N and P here are respectively 4, 2 and 2; and a structure of the stator disc corresponding to FIG. 7 is shown in FIGS. 11 and 12. FIG. 6 shows twenty-seven coil slots and three phases of windings; each phase of winding comprises nine coil units and is divided into three groups; each group comprises three coil units; M, N and P here are respectively 9, 3 and 3; and a structure of the stator disc corresponding to FIG. 6 is shown in FIGS. 2 and 3. FIG. 8 is a schematic diagram of a wire connection manner between the single coils with auxiliary windings, three windings of auxiliary coils D1-L1, D2-L2 and D3-L3 are the auxiliary windings, and electric energy is independently output.

Figure 13:
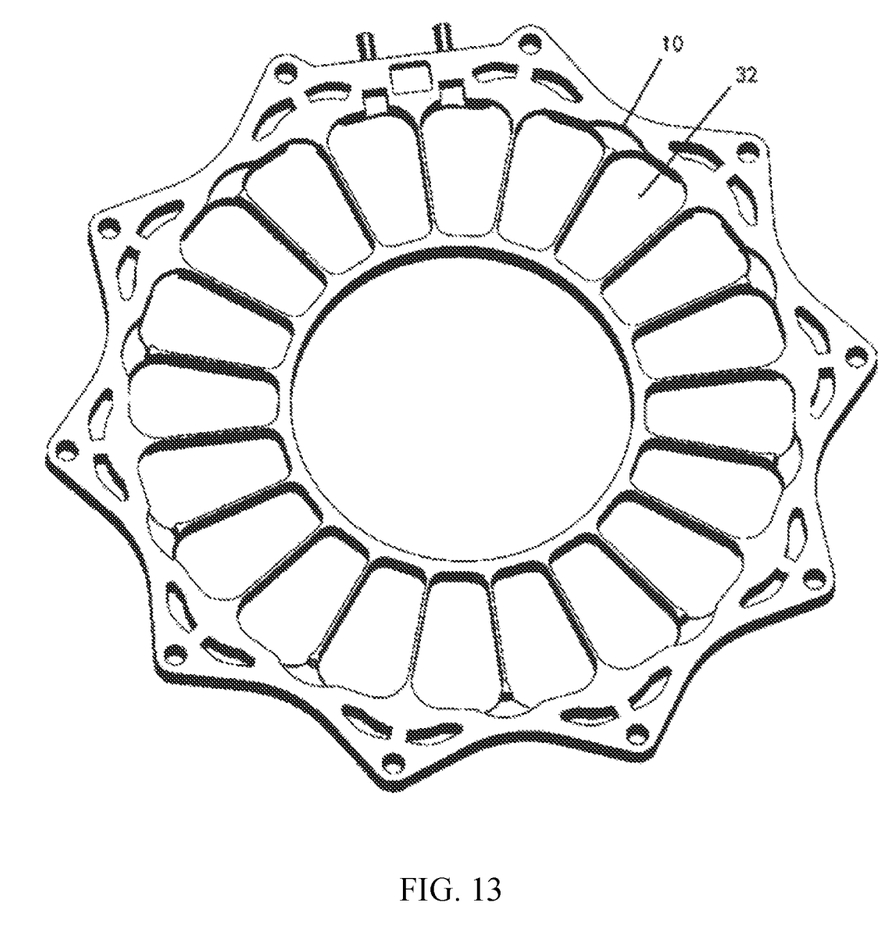
FIG. 13 is a front structural schematic diagram of an embodiment 4 of the stator disc.
Figure 14:
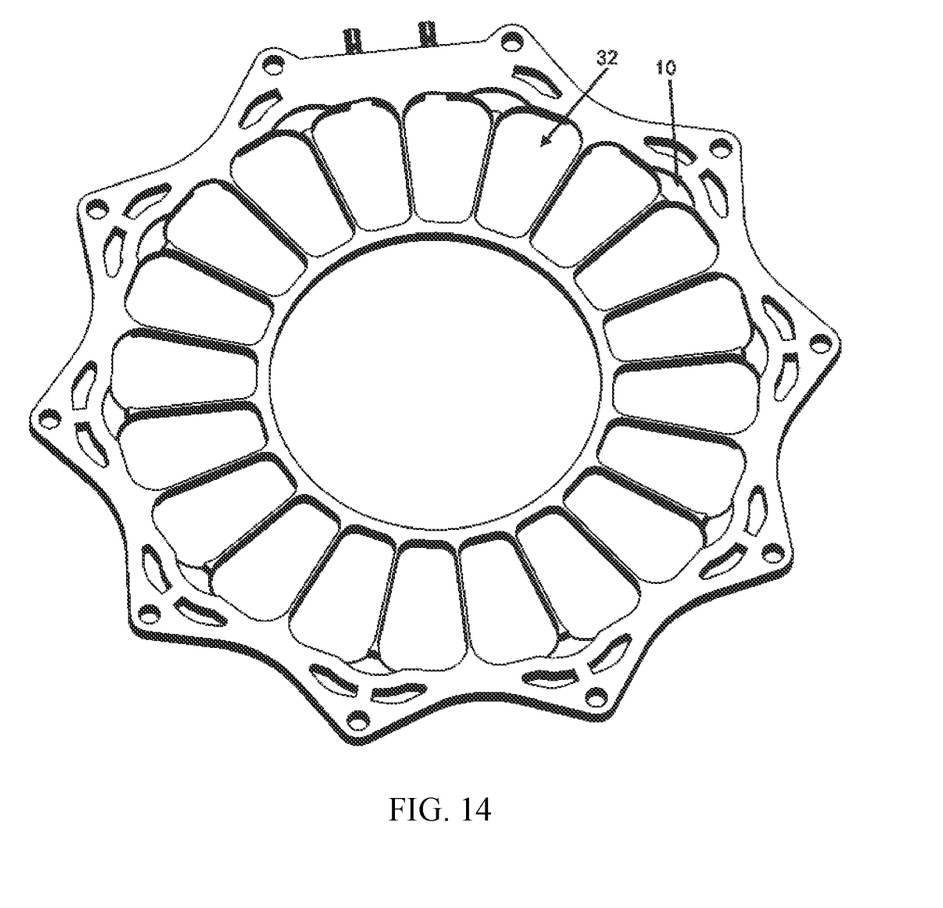
FIG. 14 is a back structural schematic diagram of the embodiment 4 of the stator disc.

FIGS. 13 and 14 show a structure of a stator disc only with one phase of winding on the stator disc; and in such the stator disc, the jumper wires in the jumper wire slots only need to be connected with the coils in each coil slot of the main winding. A winding method of the stator of the disc-type motor mainly comprises the following steps:

1. Respectively Making the Single Coils and the Stator Disc

Due to modularization of the single coils, the single coils can be independently made and can be replaced on the stator disc, so that the single coils can be produced as semi-finished products; and one single coil is integrally formed by the upper-layer single-layer coil and the lower-layer single-layer coil, wherein the coil wire is not discontinuous.

As an embodiment of winding of the single coil, the winding manner of the single coil is simultaneously winding a set circle number in opposite spiral directions in the middle of the coil wire, and then coaxially stacking coils in a double-layer manner, to form two layers of single-layer coils which are screwed in from one wire end and then wound out from the other wire end in the same spiral direction. Finally, an outline formed by winding needs to be embedded into the coil slot 1.

The stator disc is a stator base with connecting positions and welding positions being planned and can be formed by a high polymer material through a mould at one step. FIGS. 2 and 3 are the embodiment of the stator disc without installing the coils.

After an even number of layers of prefabricated single coils 21 are overlapped and filled into the coil slot 1, the wire ends of the single coils extend out of the preset wire slots, fixing glue is coated between the single coils 21 and the coil slots 1, and the fixing glue is solidified for fixing the single coils;

2. Pulling the Wires

For each single coil, the wire end of the upper-layer single-layer coil 16 is set as a wire inlet end, the wire end of the lower-layer single-layer coil 17 is set as a wire outlet end, and connecting slot positions are found for the wire ends of each phase of single coil in the wire pulling process. The single coil is connected by the serial wire, the jumper wire or the fly wire in the region at the radial outer side of the coil as required. The final connection needs welding through a welding hole; and in the step of pulling the wires, the wire ends of the single coil are arranged at the corresponding connecting wire slot positions.

If the same coil slot 1 is only internally provided with one phase of coil, the single coils are connected with each other by the serial wire necessarily and only have two connection manners, and the current directions of the two connection manners are opposite. The coils on one stator disc need to be integrally planned in advance, the current directions of each phase of coil are consistent, and the current directions need to be made by matching magnetic pole positions. Under the principle, the corresponding positions of the serial wires, the jumper wires and the fly wires are planned.

The wire ends connected with the serial wires are embedded into serial wire grooves and the serial wire joint holes 8; the wire ends of the adjacent single coils, which are connected with the jumper wires, are embedded into corresponding jumper wire grooves and the jumper wire joint holes 7; and the wire ends connected with the fly wires and phase wires are embedded into the corresponding fly wire slots 3. The conducting wires with insulating layers, which serve as the fly wires 14, are fixed at the corresponding positions of the periphery of the stator disc 12 when needed.

FIGS. 6 and 7 are respectively an arrangement solution of 27-hole coil slots and an arrangement solution of 12-hole coil slots.

3. Connecting

After the positions of the wire ends of each phase of coil are arranged into the corresponding wire slot, the connected serial wires and/or jumper wires are welded; when the fly wire exists, a wire end of the fly wire is connected with a corresponding fly wire connecting end; and after a welding line is solidified, a joint can be plugged into the serial wire joint hole 8 or the jumper wire joint hole 7, thereby eliminating the connecting wire joints protruding out of the surface of the stator disc after being welded. After a unified tin soldering, the connection of the whole coil wire is completed.

I claim:

1. A stator of a disc-type motor, comprising a disc-shaped stator disc (12) and coil units (20) fixed in coil slots of the stator disc, wherein
the stator disc (12) is in a flat plate shape and is made of a non-magnetic insulating material, and a circle of coil slots (1) surrounding the center of a circle are formed in the stator disc; connecting wire joint holes (33) and connecting wires comprising jumper wires (18) are arranged on the stator disc (12) at the radial outer sides of the coil slots (1); the connecting wires are connected with coils in the coil slots (1) through connecting wire slots; the outer sides of the connecting wire slots are formed in the surface of the stator disc (12) or buried in the stator disc (12); the jumper wire (18) refers to a connecting wire of the coils in the adjacent coil slots (1); the jumper wire (18) is arranged in a jumper wire slot (10) in the stator disc (12), and the two ends of each jumper wire slot (10) are communicated with the adjacent coil slots (1); and each connecting wire joint hole (33) is communicated with the corresponding coil slot (1) through the corresponding connecting wire slot;
the stator disc (12) is provided with one phase of main winding or multiple phases of main windings; the main winding is formed by connecting the respective phases of coil units (20) in series; the same phase of single coils (21) in one coil slot (1) of the main winding form a coil unit (20); one single coil (21) is formed by winding a coil wire (27) along the same direction without branches or ion cores; one single coil (21) is formed by axially overlapping two layers of single-layer coils (22) into one coil slot (1); the axial thickness of one single-layer coil (22) is the thickness of the single coil wire (27); and the width direction of the coil wire (27) is the axial direction of the stator disc.

2. The stator of the disc-type motor according to claim 1, wherein the single-layer coil (22) is a spiral coil in a same plane; two wire ends of one single coil (21) respectively belong to an upper-layer single-layer coil (16) and a lower-layer single-layer coil (17); and the two wire ends are located at the outer side of the spiral coil.

3. The stator of the disc-type motor according to claim 2, wherein when the stator disc (12) is provided with multiple phases of windings, each phase of winding is formed by connecting a plurality of single coils (21) through jumper wires (18) and/or fly wires (14) in series; the fly wire (14) refers to a connecting wire of an interval of more than one coil slot (1); each fly wire (14) is at least partially embedded into a fly wire slot (3); and one end of each fly wire slot (3) is communicated with the coil slot (10).

4. The stator of the disc-type motor according to claim 1, wherein each coil unit (20) is formed by axially overlapping an even number of single coils (21); connecting wire joint holes (33) comprise serial wire joint holes (8); different single coils (21) in the same coil unit (20) are connected with one another by a serial wire (19); and each serial wire (19) is welded in the serial wire joint hole (8) through the wire slot.

5. The stator of the disc-type motor according to claim 1, wherein a circle of coil slots (1) surrounding the center of the circle are also internally provided with auxiliary wire slots (31); and an auxiliary winding independent of the main winding is filled into each auxiliary wire slot (31).

6. The stator of the disc-type motor according to claim 1, wherein the cross section of each coil wire (27) is a rectangle or a rounded rectangle.

7. A winding method of the stator of the disc-type motor of any one of claims 1-6, comprising the following steps:
I. after an even number of layers of prefabricated single coils (21) are overlapped and filled into coil slots (1), coating fixing glue between the single coils (21) and the placed coil slots (1) and solidifying the fixing glue;
II. for each single coil, setting a wire end of an upper-layer single-layer coil (16) as a wire inlet end and a wire end of a lower-layer single-layer coil (17) as a wire outlet end, and if a serial wire (19) needs to be connected in the coil slot (1), embedding the wire end of the single coil, which is connected with the serial wire, into a groove in which a serial wire joint hole (8) is located; and embedding the wire end of the single coil, which is connected with a jumper wire, into a corresponding jumper wire slot (10) in which a jumper wire joint hole (7) is located, and if a fly wire needs to be connected, embedding a wire end connected with the fly wire (14) and a phase wire into a corresponding fly wire slot (3); from connecting-in to connecting-out of the phase wire, keeping the direction of current of the phase of winding which sequentially flows through the respective single-layer coils (22) single, and then selecting wire ends to be connected of the serial wires (19), the jumper wires (18) and the fly wires (14); and
III. welding the serial wires and/or the jumper wires connected, connecting the wire ends of the fly wires and corresponding fly wire connecting ends when in necessary, and eliminating connecting wire joints protruding out of the surface of the stator disc after being welded.

8. The winding method of the stator of the disc-type motor according to claim 7, wherein a winding manner of the single coil is simultaneously winding a set circle number in opposite spiral directions in the middle of a coil wire, and then coaxially stacking coils in a double-layer manner, to form double layers of coils which are screwed in from one wire end and then wound out from the other wire end in the same spiral direction.

* * * * *